G. T. BUCKHAM.
PEDESTAL GUN MOUNTING.
APPLICATION FILED JULY 20, 1917.
1,299,118.
Patented Apr. 1, 1919.
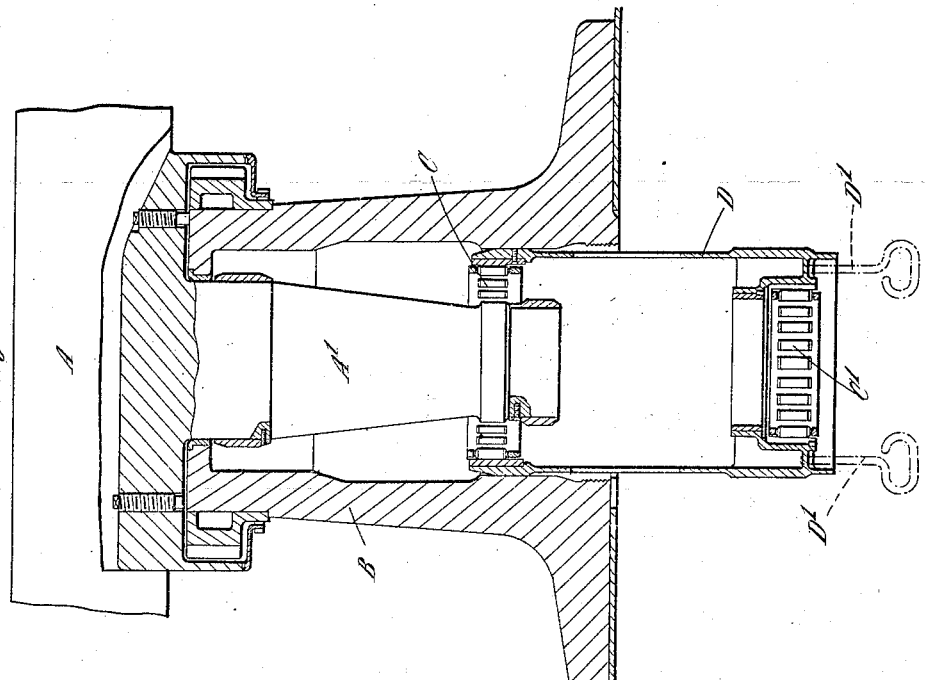
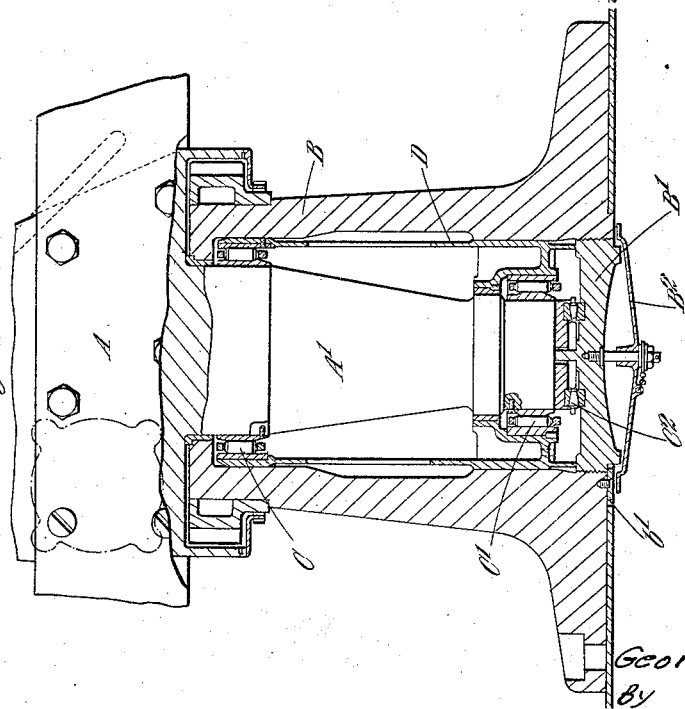
Inventor:
George T. Buckham
By
Pennie Davis Marvin & Edmonds
Attys

UNITED STATES PATENT OFFICE.

GEORGE THOMAS BUCKHAM, OF WESTMINSTER, LONDON, ENGLAND, ASSIGNOR TO VICKERS LIMITED, OF WESTMINSTER, ENGLAND.

PEDESTAL GUN-MOUNTING.

1,299,118.      Specification of Letters Patent.      Patented Apr. 1, 1919.

Application filed July 20, 1917. Serial No. 181,926.

*To all whom it may concern:*

Be it known that I, GEORGE THOMAS BUCKHAM, a subject of the King of Great Britain, residing at Vickers House, Broadway, Westminster, in the county of London, England, have invented certain new and useful Improvements in or Relating to Pedestal Gun-Mountings, of which the following is a specification.

This invention relates to pedestal gun mountings.

According to the invention means are provided whereby the upper and lower side pressure bearings interposed between the pivot of the gun carriage and the pedestal, can be withdrawn simultaneously in a downward direction from the pedestal for inspection or repair without the necessity of raising or removing the gun carriage from the pedestal, thereby saving much time and labor. The bearings are preferably of the ball or roller type and are carried in, and connected together by means of, a long sleeve or cage so that they can be removed simultaneously.

In order that the said invention may be clearly understood and readily carried into effect the same will be described more fully with reference to the accompanying drawings, in which:—

Figure 1 is a vertical section through the pedestal of a gun mounting provided with my improvements, the bearings for the gun carriage pivot being shown in their normal or operative position and Fig. 2 is a view similar to Fig. 1, but showing the bearings partly withdrawn from the pedestal.

A is part of the gun carriage and A' is its pivot. B is the pedestal. C, C' are respectively the upper and the lower roller bearings interposed between the pedestal and the pivot. D is the sleeve or cage carrying and connecting together the said bearings.

The cage D is held in position in the pedestal by a plate or plug B' which is detachably connected by screw threads, or otherwise, to the lower part of the pedestal B. This plate or plug also serves as a support for a bearing $C^2$ in contact with the lower face of the pivot A', this bearing being shown as of the roller type. The lower end of the aforesaid cage has screw threaded holes to receive handles D', D' (Fig. 2) or it may be otherwise formed to enable the cage D to be conveniently withdrawn from the pedestal after the plate or plug B' has been removed. The said plate or plug is prevented from becoming accidentally unscrewed by a key b' suitably attached to the pedestal. A detachable piece $B^2$ is provided to cover the lower end of the aforesaid plate or plug.

What I claim and desire to secure by Letters Patent of the United States is:—

1. In a pedestal gun mounting the combination with the upper and lower side pressure bearings interposed between the pivot of the gun carriage and the pedestal, of means whereby said bearings can be withdrawn simultaneously from the pedestal in a downward direction for inspection or repair without the necessity of raising or removing the gun carriage from the pedestal.

2. In a pedestal gun mounting, the combination with the upper and lower ball or roller bearings interposed between the pivot of the gun carriage and the pedestal of a sleeve or cage carrying and connecting together the bearings so that both bearings can be removed and replaced together.

In testimony whereof I affix my signature in the presence of two witnesses.

GEORGE THOMAS BUCKHAM.

Witnesses:
    JNO. R. CASWELL,
    GLADYS M. BARDEN.

Copies of this patent may be obtained for five cents each, by addressing the "Commissioner of Patents, Washington, D. C."